(12) United States Patent
Wang et al.

(10) Patent No.: US 11,933,744 B2
(45) Date of Patent: Mar. 19, 2024

(54) METHOD FOR CHARACTERIZING PROPERTY CHARACTERISTIC OF TRANSMISSION SOURCE OF SEGMENTED γ SCANNING MEASUREMENT SYSTEM

(71) Applicant: China Institute of Atomic Energy, Beijing (CN)

(72) Inventors: Zhongqi Wang, Beijing (CN); Lei Bai, Beijing (CN); Jiewen Shao, Beijing (CN); Qiang Miao, Beijing (CN)

(73) Assignee: China Institute of Atomic Energy, Beijing (CN)

( * ) Notice: Subject to any disclaimer, the term of this patent is extended or adjusted under 35 U.S.C. 154(b) by 23 days.

(21) Appl. No.: 17/598,711

(22) PCT Filed: Apr. 21, 2020

(86) PCT No.: PCT/CN2020/085864
§ 371 (c)(1),
(2) Date: Sep. 27, 2021

(87) PCT Pub. No.: WO2021/212309
PCT Pub. Date: Oct. 28, 2021

(65) Prior Publication Data
US 2022/0011245 A1    Jan. 13, 2022

(51) Int. Cl.
*G01N 23/06*    (2018.01)
*G01N 23/04*    (2018.01)
(Continued)

(52) U.S. Cl.
CPC ............. *G01N 23/06* (2013.01); *G01N 23/04* (2013.01); *G01N 23/046* (2013.01);
(Continued)

(58) Field of Classification Search
CPC ........... A61B 6/03; A61B 6/032; A61B 6/035; A61B 6/037; A61B 6/40; A61B 6/405;
(Continued)

(56) References Cited

U.S. PATENT DOCUMENTS 5,682,036 A * 10/1997 Hines .................... A61B 6/037
250/252.1
5,959,300 A * 9/1999 Hines .................... A61B 6/037
250/363.09
(Continued)

FOREIGN PATENT DOCUMENTS

| CN | 102135625 A | 7/2011 |
| CN | 104865275 A | 8/2015 |
| CN | 107462914 A | 12/2017 |

OTHER PUBLICATIONS

Office Action issued from Japanase Patent Office for Japanese Application No. 2021-557726 dated Aug. 16, 2022.
(Continued)

*Primary Examiner* — Allen C. Ho
(74) *Attorney, Agent, or Firm* — Merchant & Gould P.C.

(57) ABSTRACT

A method including: manufacturing a standard transmission object; simulating a transmission measurement process using simulation calculation method, to establish a database with respect to a transmission thickness, an equivalent water density, an original reconstruction density of the standard transmission object, a space angle cosine of the transmission source and an energy of a γ ray, fitting a corresponding relationship of the space angle cosine of the transmission source with respect to parameters of the standard transmission object and the energy of the γ ray based on the database; selecting a corresponding standard transmission object for transmission measurement for a transmission source to be characterized, to obtain an original reconstruction density of the standard transmission object; reading the space angle (Continued)

cosine of the transmission source to be characterized from the database according to fitted corresponding relationship of known parameters of the standard transmission object and the energy of the γ ray.

10 Claims, 1 Drawing Sheet

(51) Int. Cl.
    *G01N 23/046*      (2018.01)
    *G01N 23/095*      (2018.01)
    *G01N 23/20025*      (2018.01)
    *G01T 1/167*      (2006.01)
    *G01T 1/169*      (2006.01)
    *G01V 5/00*      (2006.01)

(52) U.S. Cl.
    CPC ..... *G01N 23/095* (2018.02); *G01N 23/20025* (2013.01); *G01T 1/167* (2013.01); *G01T 1/169* (2013.01); *G01V 5/0016* (2013.01)

(58) Field of Classification Search
    CPC ........... A61B 6/482; A61B 6/483; A61B 6/52; A61B 6/5205; A61B 6/5211; A61B 6/5252; A61B 6/5258; A61B 6/5282; A61B 6/5294; A61B 6/58; A61B 6/582; A61B 6/583; A61B 6/585; A61B 6/586; A61B 6/588; A61B 6/589; G01N 23/04; G01N 23/043; G01N 23/046; G01N 23/18; G01N 2223/1013; G01N 2223/1016; G01N 23/06; G01N 23/083; G01N 23/087; G01N 23/095; G01N 23/10; G01N 2223/043; G01N 2223/316; G01V 5/0016; G01V 5/0041; G01V 5/005
    USPC .......... 378/4–7, 16, 19, 53, 54, 56–58, 98.8, 378/98.9, 207, 51; 250/362, 250/363.01–363.9, 370.9

See application file for complete search history.

(56) References Cited

U.S. PATENT DOCUMENTS

| | | | |
|---|---|---|---|
| 6,975,697 B2* | 12/2005 | Kasperl | G01T 1/2985 378/18 |
| 8,891,849 B2* | 11/2014 | Rohler | A61B 6/5252 382/132 |
| 9,681,851 B2* | 6/2017 | Rohler | A61B 6/032 |
| 10,555,716 B2* | 2/2020 | Rohler | A61B 6/583 |
| 11,116,471 B2* | 9/2021 | Rohler | A61B 6/586 |
| 2014/0019094 A1* | 1/2014 | Parvin | G01T 7/00 702/189 |

OTHER PUBLICATIONS

International Search Report and Written Opinion for PCT Application No. PCT/CN2020/085864 dated Jan. 13, 2021 (7 pages).
Bai et al., "An Improved Method for the Non-Destructive Characterization of Radioactive Waste by Gamma Scanning," Applied Radiation and Isotopes, 2009, 67(10):1897-1903 (abstract only).
Krings et al., "Reconstruction of the Activity of Point Sources for the Accurate Characterization of Nuclear Waste Drums by Segmented Gamma Scanning," Applied Radiation and Isotopes, 2011, 69(6):880-889 (abstract only).

* cited by examiner

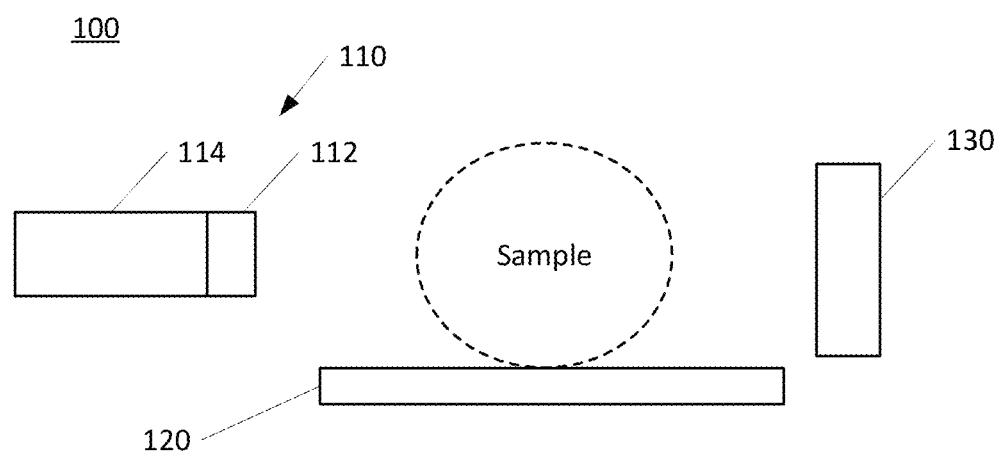

METHOD FOR CHARACTERIZING PROPERTY CHARACTERISTIC OF TRANSMISSION SOURCE OF SEGMENTED γ SCANNING MEASUREMENT SYSTEM

CROSS-REFERENCE TO RELATED APPLICATION

This application corresponds to PCT Application PCT/CN2020/085864, filed on Apr. 21, 2020.

TECHNICAL FIELD

The embodiments of the present disclosure relate to a field of non-destructive quantitative detection technology, and in particular to a method for characterizing a property characteristic of a transmission source of a segmented γ scanning measurement system.

BACKGROUND

In the technical field of non-destructive quantitative detection for radioactive nuclear waste, γ rays with different energies that pass through a sample to be measured may be attenuated to different degrees before reaching a detector. In order to accurately measure a radionuclide type of the sample to be measured, a self-absorption correction of the sample to be measured may be performed by adding a transmission source, that is, the transmission measurement of the object to be measured is performed by adding the transmission source, a transmission reconstruction process is used to determine a transmittance of the sample to be measured, and the self-absorption correction is further implemented. In existing technologies, a transmission reconstruction distortion may be corrected by iterative algorithms, but a using efficiency in actual application scenarios is reduced due to high computational costs.

In addition, for quantitative measurement analysis equipment, in the actual measurement process, measurement results may have a certain systematic deviation due to factors such as non-uniformity, counting statistics, calibration method, and reconstruction algorithm of radioactive source activity and attenuation medium distribution. A value of the systematic deviation determines a scope of application of measurement and analysis equipment. In existing technologies, since an amplitude of the systematic deviation of the segmented γ scanning measurement expands as the thickness and density of the measurement object increase, the segmented γ scanning measurement system is only suitable for medium and low density measurement objects to ensure a measurement accuracy.

SUMMARY

For the problems above, in order to improve the accuracy of transmission reconstruction distortion correction and improve the efficiency of the measurement system, the present disclosure provides a method for characterizing a property characteristic of a transmission source of a segmented γ scanning measurement system, including:

step A02. manufacturing a plurality of standard transmission objects for a target segmented γ scanning measurement system;

step A04. simulating and calculating a transmission measurement process, based on the plurality of standard transmission objects, so as to establish a database with respect to a transmission thickness of the standard transmission object, an equivalent water density of the standard transmission object, an original reconstruction density of the standard transmission object, a source distance of the standard transmission object, an energy of a γ ray and a space angle cosine of the transmission source;

step A06. fitting a corresponding relationship of the space angle cosine of the transmission source with respect to the transmission thickness of the standard transmission object, the equivalent water density of the standard transmission object, the original reconstruction density of the standard transmission object, the source distance of the standard transmission object and the energy of the γ ray based on the database;

step A08. selecting a corresponding standard transmission object for transmission measurement according to a transmission source to be characterized, so as to determine the original reconstruction density of the standard transmission object; and step A10. characterizing the space angle cosine of the transmission source to be characterized according to the corresponding relationship fitted in the step A06 by using the transmission thickness of the standard transmission object, the equivalent water density of the standard transmission object, the source distance of the standard transmission object, the original reconstruction density of the standard transmission object determined in the step A08 and the energy of the γ ray emitted by the transmission source to be characterized.

In some embodiments of the present disclosure, the segmented γ scanning measurement system includes: a transmission source assembly comprising a transmission source and a collimator, the transmission source is configured to emit the γ ray; a scanning measurement platform configured to place a sample to be measured; a detector configured to measure the γ ray passing through the sample to be measured; and a control analysis system configured to analyze a measurement result of the detector.

In some embodiments of the present disclosure, the standard transmission objects in the step A02 are a plurality of flat transmission objects.

In some embodiments of the present disclosure, in the transmission measurement in the step A08, the standard transmission object is placed in a preset position.

In some embodiments of the present disclosure, the transmission thickness of the standard transmission object is the shortest path that the γ ray traverses when penetrating the standard transmission object.

In some embodiments of the present disclosure, the equivalent water density of the standard transmission object is a density value of a water uniform medium transmission object with the same geometric shape, a linear attenuation coefficient of the water uniform medium transmission object to the energy of the γ ray and a linear attenuation coefficient of the standard transmission object to the energy of the γ ray are the same.

In some embodiments of the present disclosure, under a condition of performing a beam approximation on the γ ray, a transmission reconstruction value of the equivalent water density of the standard transmission object is the original reconstruction density of the standard transmission object.

In some embodiments of the present disclosure, determining the original reconstruction density of the standard transmission object in the step A08 includes: obtaining a counting rate $I_0(E)$ of the γ ray without placing the standard transmission object; obtaining a counting rate $I(E)$ of the γ ray by placing the standard transmission object at a preset position; performing a parallel approximation on the γ ray according to Beer's law, wherein the original reconstruction density ρ(E) of the standard transmission object is:

$$\rho(E) = \frac{\mu(E)}{\mu_m} = -\frac{1}{d}\frac{1}{\mu_m}\ln\frac{I(E)}{I_0(E)}$$

wherein μ(E) represents a linear attenuation coefficient of the γ ray with energy E passing through the standard transmission object, and $\mu_m$ represents a mass attenuation coefficient of water.

In another aspect, the present disclosure provides a method for a transmission reconstruction distortion correction for a segmented γ scanning, including:

step S002. simulating and calculating a transmission measurement process, based on a target segmented γ scanning measurement system, so as to establish a transmission reconstruction distortion correction database with respect to a transmission thickness of a transmission object, an equivalent water density of a transmission object, an original reconstruction density of a transmission object, a measurement source distance, an energy of a γ ray and a space angle cosine of a transmission source;

step S004. fitting a corresponding relationship of the equivalent water density of the transmission object with respect to the space angle cosine of the transmission source, the energy of the γ ray, the original reconstruction density of the transmission object, the transmission thickness of the transmission object and the measurement source distance based on the transmission reconstruction distortion correction database; and step S006. performing the transmission reconstruction distortion correction on a sample to be measured, including:
characterizing a space angle cosine of a transmission source of a measurement system corresponding to the sample to be measured using the method for characterizing a property characteristic of a transmission source of a segmented γ scanning measurement system;
obtaining a transmission thickness of the sample to be measured and the measurement source distance by measurement;
determining an original reconstruction density of the sample to be measured by a transmission measurement on the sample to be measured;
reading an equivalent water density of the sample to be measured from the transmission reconstruction distortion correction database according to the corresponding relationship fitted in step S004 by using the characterized space angle cosine of the transmission source, the energy of the γ ray, the original reconstruction density of the sample to be measured, the transmission thickness of the sample to be measured, and the measurement source distance.

In some embodiments of the present disclosure, the measurement source distance is a distance from the sample to be measured to the transmission source.

BRIEF DESCRIPTION OF THE DRAWING

FIG. 1 is a schematic illustration of a segmented γ scanning measurement system according to some embodiments.

DETAILED DESCRIPTION OF EMBODIMENTS

The embodiments of the present disclosure will further be described in detail below.

The present disclosure provides a method for characterizing a property characteristic of a transmission source of a segmented γ scanning measurement system, including the following steps.

In step A02, a standard transmission object is manufactured for a target segmented γ scanning measurement system, and an equivalent water density of the standard transmission object for a γ ray is known.

In step A04, a transmission measurement process is simulated and calculated based on the standard transmission object, so as to establish a database with respect to a transmission thickness of the standard transmission object, an equivalent water density of the standard transmission object, an original reconstruction density of the standard transmission object, a source distance of the standard transmission object, an energy of the γ ray and a space angle cosine of the transmission source.

In step A06. a corresponding relationship of the space angle cosine of the transmission source with respect to the transmission thickness of the standard transmission object, the equivalent water density of the standard transmission object, the original reconstruction density of the standard transmission object, the source distance of the standard transmission object and the energy of the γ ray is fitted based on the database.

In step A08, a corresponding standard transmission object is selected for transmission measurement according to a transmission source to be characterized, so as to determine the original reconstruction density of the standard transmission object.

In step A10, the space angle cosine of the transmission source to be characterized is characterized according to the corresponding relationship fitted in the step A06 by using the transmission thickness of the standard transmission object, the equivalent water density of the standard transmission object, the source distance of the standard transmission object, the original reconstruction density of the standard transmission object determined in the step A08 and the energy of the γ ray emitted by the transmission source to be characterized.

According to the embodiments of the present disclosure, as shown schematically in FIG. 1, the segmented γ scanning measurement system 100 includes a transmission source assembly 110, a scanning measurement platform 120, a detector 130, and a control analysis system (not shown). The transmission source assembly 100 includes a collimator 112 and a transmission source 114. The γ ray emitted by the transmission source is usually a cone-shaped beam with a certain spatial angle. Since it is not realistic to solve the spatial angle of the transmission source in practical application scenarios, the spatial angle of the transmission source should be characterized to improve the accuracy of transmission reconstruction distortion correction.

In an embodiment of the present disclosure, in step A02, a set of standard transmission objects are manufactured, for verification of intermediate data and final results, according to a property of the transmission source assembly of the segmented γ scanning measurement system as well as requirements of its applicable scope and accuracy. And linear attenuation coefficients of the standard transmission object for γ rays with different energies are known.

It should be noted that in the actual measurement process, measured samples are mostly a transmission object with uneven density composed of mixed materials, and the transmission object has a certain density value for a specific energy of a transmitted γ ray. A penetration rate of the transmitted γ ray to the transmission object will be equivalent to the transmittance of the transmitted γ ray to a transmission object with the same geometric shape composed of water having the same density value, and the density value is called an equivalent water density. According to the transmittance of the γ ray with the specific energy to the transmission object obtained by the transmission measurement, Beer's law is used to make a parallel beam approximate assumption for the γ ray, and a determined equivalent water density of the transmission object with respect to the energy of the γ ray is called the original reconstruction density.

In some embodiments of the present disclosure, a material of the standard transmission object is polyethylene, graphite, aluminum, or the like. According to the material and the transmission thickness of the standard transmission object, the equivalent water density for the γ ray with the specific energy may be calculated by looking up a table.

It is known that the linear attenuation coefficient μ, a density ρ of a substance and a mass attenuation coefficient $\mu_m$ follow: $\mu = \mu_m \cdot \rho$.

The linear attenuation coefficient μ represents a probability of a ray being absorbed when passing through a unit distance in the substance, and the mass attenuation coefficient $\mu_m$ represents a attenuation degree of a ray for a unit mass of substance.

If material A with a uniform density has a mass attenuation coefficient $\mu_{mA}$ and a density $\sigma_A$, then the equivalent water density $\sigma_{A\_water}$ of the material A may be calculated by: $\rho_{A\_water} = \mu/\mu_{m\_water} = \mu_{mA} \cdot \rho_A / \mu_{m\_water}$.

In step A04, the transmission measurement is simulated and calculated for the standard transmission object. A transmission process, in which the γ ray beam with energy E emitted from the transmission source at a spatial angle δ passes through a standard transmission object with a thickness d, is simulated and calculated using a Monte Carlo simulation calculation method. The standard transmission object is set at a preset position of the transmission source. The simulation calculation program is repeated for the energy range of the γ ray of the transmission source for standard transmission objects with different transmission thickness, so as to determine a dependent variable (the original reconstruction density ρ') corresponding to independent variables (the space angle cosine of the transmission source, the transmission thickness d and the equivalent water density ρ of the standard transmission object, and the energy E of the γ ray). In this manner, the transmission reconstruction distortion correction database for the standard transmission object is established.

The establishment of the transmission reconstruction distortion correction database of the standard transmission object is used for convenient characterization of parameters. In the actual application process, through the measurement of the above-mentioned related parameters, it is possible to quickly implement the characterization of a target variable with respect to an acquired variable.

In step A06, the corresponding relationship of the space angle cosine of the transmission source with respect to the original reconstruction density ρ' of the standard transmission object, the transmission thickness d and the equivalent water density ρ of the standard transmission object, the source distance x of the standard transmission object and the energy E of the γ ray is fitted based on the transmission reconstruction distortion correction database of the standard transmission object. Through the corresponding relationship, a corresponding target parameter may be quickly retrieved from the database according to the known parameter, thereby saving calculation cost.

In step A08, in the actual measurement process, a plurality of corresponding standard transmission objects are selected for the transmission source that needs to be characterized, counting rates of the γ ray are respectively read from the detector when the standard transmission object is not placed, and when the measurement source distance is set (that is, the distance between the standard transmission object and the transmission source is the preset position). The original reconstruction density of the standard transmission object is obtained by approximate calculation of the γ ray beam emitted by the transmission source.

According to Beer's law, when an incident parallel γ ray beam with energy E passes through the transmission object, the intensity $I_0(E)$ of the beam before passing through the transmission object and the intensity $I(E)$ of the beam after passing through the transmission object satisfy an exponential attenuation regulation: $I(E) = I_0(E) \cdot \exp[-\mu(E) \cdot d]$.

$\mu(E)$ represents the linear attenuation coefficient of the γ ray with energy E passing through the material of the transmission object; and d is the transmission thickness of the transmission object.

The original reconstruction density of the transmission object is:

$$\rho(E) = \frac{\mu(E)}{\mu_m} = -\frac{1}{d}\frac{1}{\mu_m}\ln\frac{I(E)}{I_0(E)}.$$

As above mentioned, the transmission thickness of the corresponding standard transmission object is a known parameter, and the equivalent water density of a corresponding characteristic γ ray is a known parameter. The energy parameter of the characteristic γ ray, the calculated original reconstruction density of the standard transmission object, the source distance of the standard transmission object obtained according to the preset position, the equivalent water density of the standard transmission object and the transmission thickness of the standard transmission object are brought into the corresponding relationship of the space angle cosine of the transmission source. According to the corresponding relationship, the characterization of the spatial angle cosine of the transmission source with respect to the above known parameters may be directly obtained from the transmission reconstruction distortion correction database of the standard transmission object. And an average of characterization results of the plurality of standard transmission objects is calculated, which is the space angle cosine of the transmission source to be characterized.

The present disclosure establishes the transmission reconstruction distortion correction database of the standard transmission object through the Monte Carlo method. The efficiency in actual application scenarios is improved, and the accuracy of characterizing the space angle of the γ ray beam emitted by the transmission source is improved.

In another aspect, a method for a transmission reconstruction distortion correction for a segmented γ scanning is provided, including following steps.

In step S002, a transmission measurement process is simulated and calculated based on a target segmented γ scanning measurement system, so as to establish a transmission reconstruction distortion correction database with respect to a transmission thickness of a transmission object, an equivalent water density of a transmission object, an original reconstruction density of a transmission object, a measurement source distance, an energy of a γ ray and a space angle cosine of a transmission source.

In step S004, a corresponding relationship of the equivalent water density of the transmission object with respect to the space angle cosine of the transmission source, the energy of the γ ray, the original reconstruction density of the transmission object, the transmission thickness of the transmission object and the measurement source distance is fitted based on the transmission reconstruction distortion correction database.

In step S006, the transmission reconstruction distortion correction is performed on a sample to be measured, including following steps.

A space angle cosine of a transmission source of a measurement system corresponding to the sample to be measured is characterized using the method for characterizing a property characteristic of a transmission source of a segmented γ scanning measurement system.

A transmission thickness of the sample to be measured and the measurement source distance are obtained by measurement.

An original reconstruction density of the sample to be measured is determined by a transmission measurement on the sample to be measured.

An equivalent water density of the sample to be measured is read from the transmission reconstruction distortion correction database according to the corresponding relationship fitted in step S004 by using the characterized space angle cosine of the transmission source, the energy of the γ ray, the original reconstruction density of the sample to be measured, the transmission thickness of the sample to be measured, and the measurement source distance.

In an embodiment of the present disclosure, in step S002, by using the Monte Carlo method, the transmission measurement process is simulated for the segmented γ scanning measurement system, parameter changing interval and range are determined according to the applicable range of the segmented γ scanning measurement system. For example, the energy range of the γ ray is determined according to the transmission source assembly; the space angle of the γ ray beam emitted by the transmission source (that is, the range of the space angle cosine of the transmission source) is determined according to the known parameter of the transmission source assembly; the measurement source distance (that is, the distance change interval between the transmission object and the transmission source) and the equivalent water density change interval of the transmission object corresponding to energies of different γ rays is set according to empirical measurement data. According to the setting of the above independent variables, the Monte Carlo method is used to determine the original reconstruction density of the corresponding transmission object, and the transmission reconstruction distortion correction database is established.

Based on the transmittance formula, the transmittance T of the γ ray beam with a certain spatial angle emitted by the transmission source is:

$$T = \frac{I}{I_0} = \frac{\int \exp(-\mu \cdot D(\omega)) f(\omega) d\omega}{\int f(\omega) d\omega}$$

$D(\omega)$ is a path length of a transmitted ray penetrating the transmission object in a direction where an angle cosine is $\omega$, $f(\omega)$ is a detection efficiency of the detector for a ray with an energy E and an angle cosine $\omega$ with respect to an incidence direction, and a range of the integration is a range of values of the angle cosine that is meaningful for the spatial angle cosine δ of the transmission source.

As above mentioned, in the transmission reconstruction process, an approximate processing is adopted for the γ ray beam, that is, the path length of the γ ray passing through the transmission object is approximately regarded as a constant d. The original reconstruction density ρ' based on the assumption of parallel beam γ ray is calculated. An adjusted transmittance T' is obtained through iterative processing on the original reconstruction density ρ' with an adjustment increment Δ, When the transmittance T' is close to the measured value T, the iterative reaction ends. At this time, the μ calculated according to the corresponding equivalent water density ρ is the final transmission reconstruction result.

According to the above content, when the transmission measurement condition is determined, the original reconstruction density and the equivalent water density of the transmission object with a certain transmission thickness are uniquely determined with respect to the space angle cosine of the transmission source at the determined measurement source distance (that is, when the distance between the transmission object and the transmission source is constant) for the transmission reconstruction process of the γ ray with energy E.

The Monte Carlo method is used to simulate the transmission measurement process based on the variable range or interval set above, complete the relationship correspondence of each variable, and establish the transmission reconstruction distortion correction database for the segmented γ scanning measurement system.

In step S004, the corresponding relationship of the equivalent water density ρ of the transmission object with respect to the spatial angle δ, the energy E of the γ ray, the measurement source distance x, the transmission thickness d of the transmission object and the original reconstruction density ρ' of the transmission object is fitted based on the point set composed of various variables in the transmission reconstruction distortion correction database.

In step S006, in the actual measurement process, the method for characterizing the property characteristic of the transmission source of the segmented γ scanning measurement system is used to characterize the space angle cosine of the transmission source; the original reconstruction density of the sample to be measured is calculated based on Beer's law according to the counting rates of the γ ray before and after the sample is placed by the detector; the distance between the sample to be measured and the transmission source (that is, the measurement source distance x) and the transmission thickness d of the sample to be measured are obtained by direct measurement; and the energy E of the γ ray corresponds to the characteristic γ ray based on the sample to be measured.

In some embodiments of the present disclosure, the transmission thickness d and the measurement source distance x of the sample to be measured may be measured by a scale or a laser positioning ranging tool.

The above-mentioned parameters obtained through measurement and calculation are bring into the fitted corresponding relationship about the original reconstruction density of the transmission object. Through the corresponding relationship, the equivalent water density of the corresponding sample to be measured may be quickly read from the transmission reconstruction distortion correction database. Further, the linear attenuation coefficient of the characteristic γ ray for the sample to be measured is calculated, and the transmission reconstruction distortion correction of the sample to be measured is completed.

The method for a transmission reconstruction distortion correction for a segmented γ scanning is provided by the present disclosure. For the error caused by the parallel approximation of the ray beam emitted by the transmission source during the transmission reconstruction process, the use efficiency of the segmented γ scanning measurement system in actual application scenarios is improved by establishing the transmission reconstruction distortion correction database based on the segmented γ scanning measurement system, and the calculation cost is reduced; the property of the transmission source is characterized by establishing the transmission reconstruction distortion correction database of the standard transmission object, improving the accuracy of the transmission reconstruction distortion correction, reducing the systematic deviation of the segmented γ scanning measurement system, and increasing the application range of the system for the medium density of the sample to be measured.

The above embodiments are only used to illustrate the present disclosure, but not to limit the present disclosure. Those skilled in the art may make various changes and modifications without departing from the spirit and scope of the present disclosure. Therefore, all equivalent technical solutions also belong to the scope of the present disclosure, and the patent protection scope of the present disclosure should be defined by the claims.

What is claimed is:

1. A method for characterizing a property characteristic of a transmission source of a segmented γ scanning measurement system, comprising:
    step A02. manufacturing a plurality of standard transmission objects for the segmented γ scanning measurement system;
    step A04. simulating and calculating a transmission measurement process, based on the plurality of standard transmission objects, so as to establish a database with respect to a transmission thickness of each standard transmission object of the plurality of standard transmission objects, an equivalent water density of each standard transmission object, an original reconstruction density of each standard transmission object, a source distance of each standard transmission object, an energy of a γ-ray, and a space angle cosine of a transmission source;
    step A06. fitting a corresponding relationship of the space angle cosine of the transmission source with respect to the transmission thickness of each standard transmission object, the equivalent water density of each standard transmission object, the original reconstruction density of each standard transmission object, the source distance of each standard transmission object, and the energy of the γ-ray based on the database;
    step A08. selecting a corresponding standard transmission object for a transmission measurement according to the transmission source to be characterized, so as to determine the original reconstruction density of the corresponding standard transmission object; and
    step A10. characterizing the space angle cosine of the transmission source to be characterized according to the corresponding relationship fitted in the step A06 by using the transmission thickness of the corresponding standard transmission object, the equivalent water density of the corresponding standard transmission object, original reconstruction density of the corresponding standard transmission object, the source distance of the corresponding standard transmission object determined in the step A08, and the energy of the γ-ray emitted by the transmission source to be characterized.

2. The method according to claim 1, wherein the segmented γ scanning measurement system comprises:
    a transmission source assembly comprising a transmission source and a collimator, wherein the transmission source is configured to emit the γ-ray;
    a scanning measurement platform configured to place a sample to be measured; and
    a detector configured to measure the γ-ray passing through the sample to be measured.

3. The method according to claim 1, wherein the plurality of standard transmission objects in the step A02 are a plurality of flat transmission objects.

4. The method according to claim 1, wherein in the transmission measurement in the step A08, the corresponding standard transmission object is placed in a preset position, so that source distances of the plurality of standard transmission objects are the same.

5. The method according to claim 1, wherein the transmission thickness of each standard transmission object is the shortest path that the γ-ray traverses when penetrating each standard transmission object.

6. The method according to claim 1, wherein the equivalent water density of each standard transmission object is a density value of a water uniform medium transmission object with a same geometric shape as a geometric shape of each standard transmission object, a linear attenuation coefficient of the water uniform medium transmission object to the energy of the γ-ray and a linear attenuation coefficient of each standard transmission object to the energy of the γ-ray are the same.

7. The method according to claim 6, wherein under a condition of performing a beam approximation on the γ-ray, a transmission reconstruction value of the equivalent water density of each standard transmission object is the original reconstruction density of each standard transmission object.

8. The method according to claim 7, wherein determining the original reconstruction density of the corresponding standard transmission object in the step A08 comprises:
    obtaining a counting rate $I_0(E)$ of the γ-ray without placing the corresponding standard transmission object;
    obtaining a counting rate $I(E)$ of the γ-ray by placing the corresponding standard transmission object at a preset position; and
    performing a parallel approximation on the γ-ray according to Beer's law, wherein the original reconstruction density $\rho(E)$ of the corresponding standard transmission object is:

$$\rho(E) = \frac{\mu(E)}{\mu_m} = -\frac{1}{d}\frac{1}{\mu_m}\ln\frac{I(E)}{I_0(E)}$$

wherein $\mu(E)$ represents a linear attenuation coefficient of the γ-ray with an energy E passing through the corresponding standard transmission object, and $\mu_m$ represents a mass attenuation coefficient of water.

9. A method for a transmission reconstruction distortion correction for a segmented γ scanning, comprising:
    step S002. simulating and calculating a transmission measurement process, based on a segmented γ scanning measurement system, so as to establish a transmission reconstruction distortion correction database with respect to a transmission thickness of a transmission object, an equivalent water density of the transmission object, an original reconstruction density of the transmission object, a measurement source distance, an energy of a γ-ray, and a space angle cosine of a transmission source;

step S004. fitting a corresponding relationship of the equivalent water density of the transmission object with respect to the space angle cosine of the transmission source, the energy of the γ-ray, the original reconstruction density of the transmission object, the transmission thickness of the transmission object, and the measurement source distance based on the transmission reconstruction distortion correction database; and step S006. performing a transmission reconstruction distortion correction on a sample to be measured, comprising:

characterizing a space angle cosine of a transmission source of the segmented γ scanning measurement system corresponding to the sample to be measured using the method according to claim 1;

obtaining a transmission thickness of the sample to be measured and the measurement source distance by a measurement;

determining an original reconstruction density of the sample to be measured by a transmission measurement on the sample to be measured; and reading an equivalent water density of the sample to be measured from the transmission reconstruction distortion correction database according to the corresponding relationship fitted in step S004 by using the characterized space angle cosine of the transmission source, the energy of the γ-ray, the original reconstruction density of the sample to be measured, the transmission thickness of the sample to be measured, and the measurement source distance.

10. The method according to claim 9, wherein the measurement source distance is a distance from the sample to be measured to the transmission source.

\* \* \* \* \*